(12) United States Patent
Demissie et al.

(10) Patent No.: US 11,441,547 B2
(45) Date of Patent: Sep. 13, 2022

(54) BEARING ARRANGEMENT FOR A WIND TURBINE AND WIND TURBINE

(71) Applicant: Siemens Gamesa Renewable Energy A/S, Brande (DK)

(72) Inventors: Edom Demissie, Sheffield (GB); Morten Soerensen, Horsens (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 34 days.

(21) Appl. No.: 15/931,902

(22) Filed: May 14, 2020

(65) Prior Publication Data
US 2020/0362829 A1 Nov. 19, 2020

(30) Foreign Application Priority Data
May 16, 2019 (EP) .................................... 19174876

(51) Int. Cl.
*F03D 80/70* (2016.01)
*F03D 15/00* (2016.01)

(52) U.S. Cl.
CPC ............. *F03D 80/70* (2016.05); *F03D 15/00* (2016.05)

(58) Field of Classification Search
CPC ...................................................... F03D 80/70
See application file for complete search history.

(56) References Cited

U.S. PATENT DOCUMENTS 2,778,696 A 1/1957 Lease
5,743,657 A * 4/1998 O'Reilly ................. F16C 17/03
384/312
6,766,697 B1 7/2004 Perez et al.
9,915,246 B2 * 3/2018 Wendeberg ........... F16C 23/086
9,995,283 B2 6/2018 Stiesdal
(Continued)

FOREIGN PATENT DOCUMENTS

CN 101495768 A 7/2009
CN 101932839 A 12/2010
(Continued)

OTHER PUBLICATIONS

Extended European Search Report in corresponding European Patent Application No. 19174876.3 dated Oct. 18, 2019. 8 pages.
(Continued)

*Primary Examiner* — Ninh H. Nguyen
*Assistant Examiner* — John S Hunter, Jr.
(74) *Attorney, Agent, or Firm* — Schmeiser, Olsen & Watts LLP

(57) ABSTRACT

A bearing arrangement for a wind turbine including a bearing housing and a drive shaft, whereby the drive shaft is arranged within the bearing housing in an axial direction along a longitudinal axis of the bearing housing, a downwind bearing and an upwind bearing, whereby the downwind bearing and the upwind bearing are arranged between the bearing housing and the drive shaft, wherein the downwind bearing and/or the upwind bearing is a radial fluid bearing including multiple radial bearing bodies, multiple radial tiltable support structures secured to the multiple radial bearing bodies, whereby each one of a multiple of radial bearing pads is attached to one of the multiple radial tiltable support structures and the multiple radial bearing pads are arranged about the drive shaft is provided.

9 Claims, 9 Drawing Sheets

(56) References Cited

U.S. PATENT DOCUMENTS

| | | |
|---|---|---|
| 2007/0253658 A1 | 11/2007 | Maloney |
| 2011/0019950 A1 | 1/2011 | Hirai et al. |
| 2011/0254281 A1 | 10/2011 | Noda et al. |
| 2012/0099993 A1 | 4/2012 | Guerenbourg et al. |
| 2013/0336605 A1 | 12/2013 | Buguin et al. |
| 2015/0075833 A1 | 3/2015 | Dotan et al. |
| 2015/0159631 A1 | 6/2015 | Bitsch |
| 2016/0215815 A1 | 7/2016 | Ryu et al. |
| 2017/0260970 A1* | 9/2017 | Stiesdal ............... F16C 17/10 |
| 2019/0072134 A1 | 3/2019 | Rajendran et al. |

FOREIGN PATENT DOCUMENTS

| | | |
|---|---|---|
| CN | 103470319 A | 12/2013 |
| CN | 104314997 A | 1/2015 |
| CN | 104364521 | 2/2015 |
| CN | 105492739 A | 4/2016 |
| CN | 107191474 A | 9/2017 |
| CN | 108223557 A | 6/2018 |
| CN | 109458394 A | 3/2019 |
| CN | 109519343 A | 3/2019 |
| EP | 3252306 A1 | 12/2017 |
| EP | 3276192 A1 | 1/2018 |
| EP | 3460238 A1 | 3/2019 |
| EP | 3460269 A1 | 3/2019 |
| EP | 3460271 A1 | 3/2019 |
| EP | 3577356 A1 | 12/2019 |
| EP | 3577361 A1 | 12/2019 |
| GB | 2292192 A | 2/1996 |
| JP | 2001124062 A | 5/2001 |
| WO | 2011003482 | 1/2011 |
| WO | 2018024410 A1 | 2/2018 |

OTHER PUBLICATIONS

Office Action in related Chinese Patent Application No. 202010414175.2 dated Aug. 3, 2021. 14 pages.

Yongming, Sun et al.: "Analysis of Tilting-pad Bearing oil-film unstability in centrifugal compressor"; 2012.

* cited by examiner

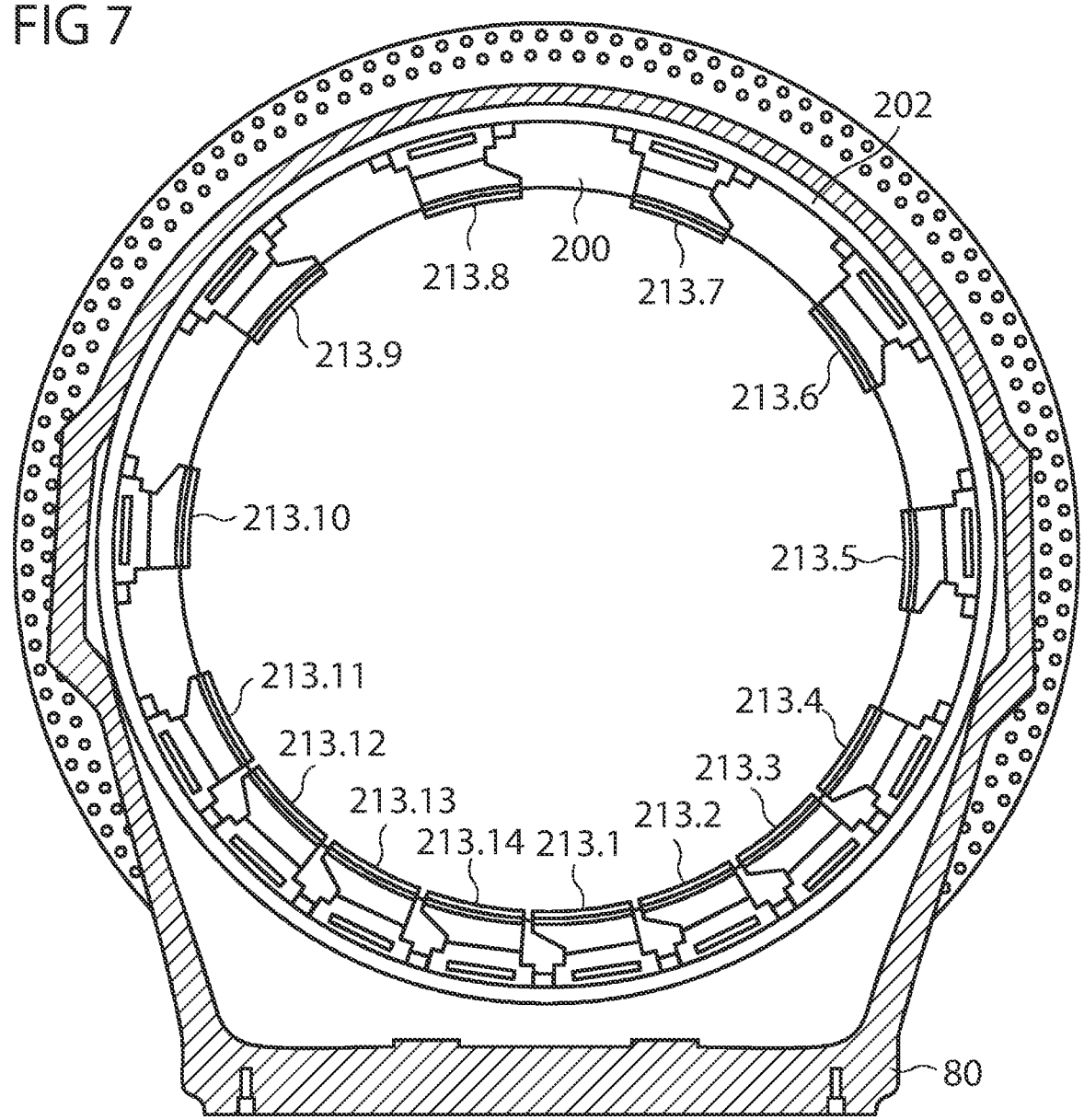

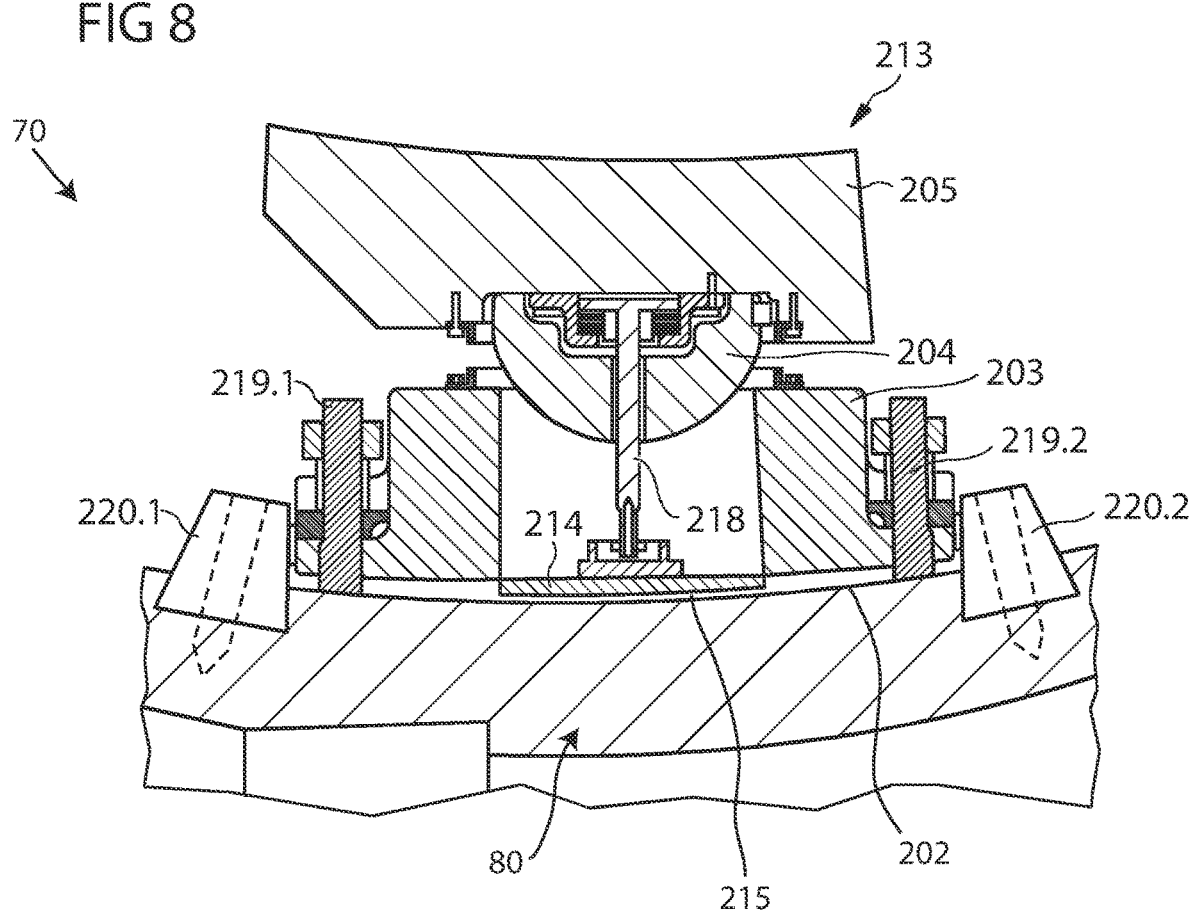

BEARING ARRANGEMENT FOR A WIND TURBINE AND WIND TURBINE

CROSS-REFERENCE TO RELATED APPLICATIONS

This application claims priority to European Patent Application No. 19174876.3, having a filing date of May 16, 2019, the entire contents of which are hereby incorporated by reference.

FIELD OF TECHNOLOGY

The following relates to a bearing arrangement for a wind turbine and a wind turbine.

BACKGROUND

In general, bearing arrangements of wind turbines comprise a bearing housing and a drive shaft, whereby the drive shaft is arranged within the bearing housing in an axial direction along a longitudinal axis of the bearing housing. Bearings of the bearing arrangement are arranged about the drive shaft, so that the drive shaft can be rotated within the bearing housing by means of a rotor of the wind turbine. Such a bearing arrangement is known from EP 3 276 192 A1, for example.

Such bearings must be attached to the bearing housing. Such a bearing may be a radial fluid bearing comprising multiple radial bearing bodies, multiple radial tiltable support structures secured to the multiple radial bearing bodies, whereby each one of a multiple of radial bearing pads is attached to one of the multiple radial tiltable support structures. In the prior art, the radial bearing bodies are provided within pockets of the bearing housing. Such pockets may be machined into the bearing housing, for example. However, the pockets are a source of tolerances, which makes it difficult to achieve a desired fitting of the radial fluid bearing with its multiple radial bearing pads about the drive shaft. Therefore, the pockets require three-dimensional measurement after their machining into the bearing housing and may require rework to ensure the desired fitting.

SUMMARY

An aspect relates to eliminating or at least reducing disadvantages in the prior art techniques related to the fitting of the radial fluid bearing about the drive shaft, in particular to provide a bearing arrangement for a wind turbine with a fitting concept having little tolerances and low manufacturing costs.

An aspect relates to a bearing arrangement of a wind turbine. Thereby, the features and details described in connection with the bearing arrangement of the embodiment of the present invention apply in connection with the wind turbine of the embodiment of the present invention, so that regarding the disclosure of the individual aspects of the present invention it is or can be referred to one another.

An aspect relates to a bearing arrangement for a wind turbine comprising a bearing housing and a drive shaft, whereby the drive shaft is arranged within the bearing housing in an axial direction along a longitudinal axis of the bearing housing, the bearing arrangement further comprising a downwind bearing and an upwind bearing, whereby the downwind bearing and the upwind bearing are arranged between the bearing housing and the drive shaft, wherein the downwind bearing and/or the upwind bearing is a radial fluid bearing comprising multiple radial bearing bodies, multiple radial tiltable support structures secured to the multiple radial bearing bodies, whereby each one of a multiple of radial bearing pads is attached to one of the multiple radial tiltable support structures and the multiple radial bearing pads are arranged about the drive shaft, whereby at least one curved interface plate is attached to at least one of the multiple radial bearing bodies opposite of the radial bearing pad, whereby the interface plate is arranged in contact with a cylindrical seat of the radial fluid bearing.

By means of the embodiment of the present invention, the radial bearing pads are arranged with respect to the drive shaft with very little tolerances and at low cost with respect to manufacture and assembly.

The multiple radial tiltable support structures allow for the multiple radial bearing pads to be tiltable with respect to the drive shaft. Thereby, tolerances between the drive shaft and the radial bearing pads can be compensated for.

In particular, a curved interface plate may be attached to each one of the multiple radial bearing bodies opposite of the radial bearing pad, whereby the interface plates are arranged in contact with a cylindrical seat of the radial fluid bearing.

A first interface plate side of the at least one interface plate, which is contact with the cylindrical seat, has a curvature corresponding to a curvature of the cylindrical seat. Thereby, the interface plate is provided with a large contact surface contacting the cylindrical seat, whereby the stability of the radial fluid bearing is improved.

In particular, a second interface plate side of the at least one interface plate, which is located opposite of the first interface plate, is predominantly plain or plain. Predominantly in this sense means that more than half of the surface of the second interface plate side is plain. Thereby, attachment of the radial bearing body to the interface plate may be facilitated.

Moreover, at least one of the at least one interface plate comprises at least one interface plate attachment means for attaching the at least one interface plate to the at least one of the multiple radial bearing bodies. The at least one of the multiple radial bearing bodies may comprise a corresponding radial bearing body attachment means. The interface plate attachment means and the corresponding radial bearing body attachment means may be attached to each other by a further attachment means element. Thereby, the interface plate may be securely attached to the radial bearing body.

Further, at least one of the at least one interface plate attachment means is an interface plate through hole. The interface plate through hole may comprise threads, for example. A radial bearing body attachment means may further be a radial bearing body through hole, which also may comprise threads. An attachment means element may be a bolt, in particular a threaded bolt, for example.

In particular, the cylindrical seat is formed in the bearing housing. Moreover, the cylindrical seat may be integrally formed, in particular monolithically designed, with the bearing housing. Thereby, the cylindrical seat of the radial fluid bearing is stably provided at the bearing housing.

At least one of the multiple radial bearing bodies to which the at least one interface plate is attached is fixed by means of limit stops attached to the cylindrical seat, whereby the limit stops are adjacent to the at least one of the multiple radial bearing bodies in a tangential direction along the circumference of the cylindrical seat. In particular, the limit stops may be arranged in grooves arranged in the cylindrical seat. Further, the limit stops may be attached to the cylindrical seat by means of bolts. In particular, each one of the multiple radial bearing bodies is separated by another one of the multiple radial bearing bodies by means of one of the limit stops along the cylindrical seat. The limit stops prevent a movement of the interface plate in a tangential direction along the circumference of the cylindrical seat.

The at least one of the multiple radial bearing bodies to which the at least one interface plate is attached is fixed to the cylindrical seat by means of at least one fastening element, whereby the at least one fastening element at least partially extends through the at least one of the multiple radial bearing bodies. In particular, at least two fastening elements are extending at least partially through the at least one of the multiple radial bearing bodies. In particular, the at least one fastening element protrudes into the cylindrical seat. The fastening element may be a bolt, for example. The at least one fastening element prevents a movement of the interface plate in a radial direction from the bearing housing to the drive shaft.

In particular, at least one of the multiple radial tiltable support structures may comprise a ball head. The ball head can provide a tilting functionality for compensation of tolerances in the radial fluid bearing.

Moreover, the at least one of the multiple radial bearing bodies securing the at least one of the multiple radial tiltable support structures comprising the ball head may comprise a ball socket for the ball head.

Further, at least one of the multiple tiltable support structures may be secured to at least one of the multiple radial bearing bodies by means of a spring connection. The spring connection is a low-cost part for implementing a tilting functionality.

An aspect relates to a wind turbine comprising a bearing arrangement according to the embodiment of the present invention, whereby the wind turbine further comprises a rotor connected to drive the drive shaft and a generator connected to be driven by the drive shaft.

The generator may be a direct drive generator or a geared generator having a gearbox, for example. The rotor is also commonly referred to as a hub of the wind turbine. Two, three or more wind turbine blades may be attached to the rotor or hub. The wind turbine may further comprise a nacelle, which may be supported on a tower of the wind turbine. The nacelle may comprise the bearing arrangement. The bearing arrangement, in particular the bearing housing, and the generator may be attached to the nacelle and/or the tower.

BRIEF DESCRIPTION

Some of the embodiments will be described in detail, with reference to the following figures, wherein like designations denote like members, wherein:

FIG. 7 depicts a front view on a sectional cut through the bearing arrangement of FIG. 6;

FIG. 8 depicts a view on a detail of the bearing arrangement of FIG. 7 showing a radial bearing unit;

DETAILED DESCRIPTION

Same objects in FIGS. 1 to 9 are denominated with the same reference number. If there is more than one object of the same kind in one of the figures, the objects are numbered in ascending order with the ascending number of the object being separated from its reference number by a dot. The specific dimensions of features and parts in the figures are exemplary and may be enlarged for ease of reference only.

Figure 1:
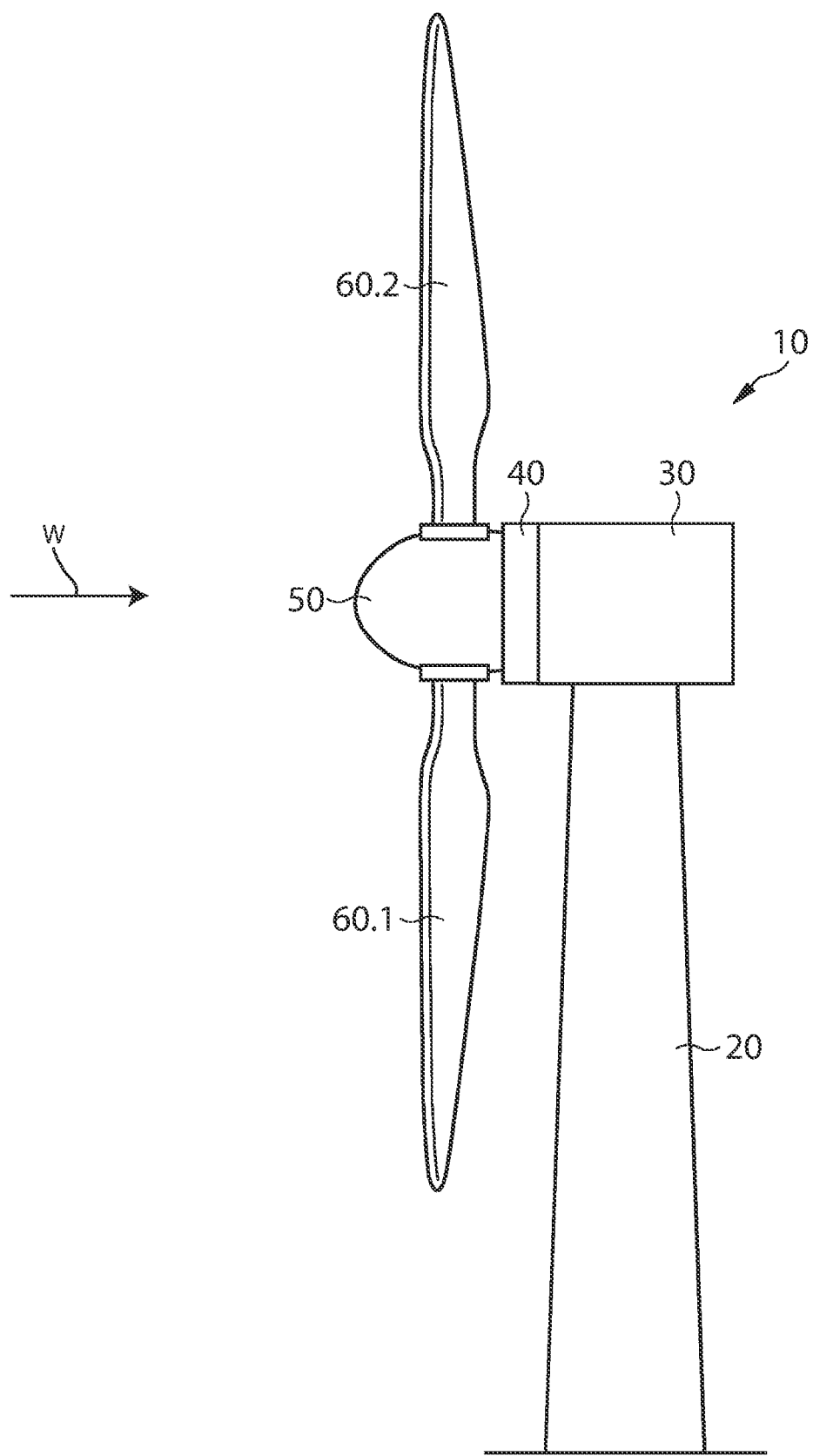
FIG. 1 depicts a side view on a wind turbine.

FIG. 1 shows a side view on a wind turbine 10. The wind turbine 10 comprises a supporting tower 20 and a nacelle 30, whereby the nacelle 30 is attached to the supporting tower 20. The nacelle 30 comprises a bearing arrangement 70, which is not shown in FIG. 1 but can be seen in FIG. 2. The wind turbine 10 further comprises a generator 40 attached to a rotor 50 of the wind turbine 10. Two wind turbine blades 60.1, 60.2 are attached to the rotor 50. Wind is configured to approach the wind turbine 10 from a wind direction W.

Figure 2:
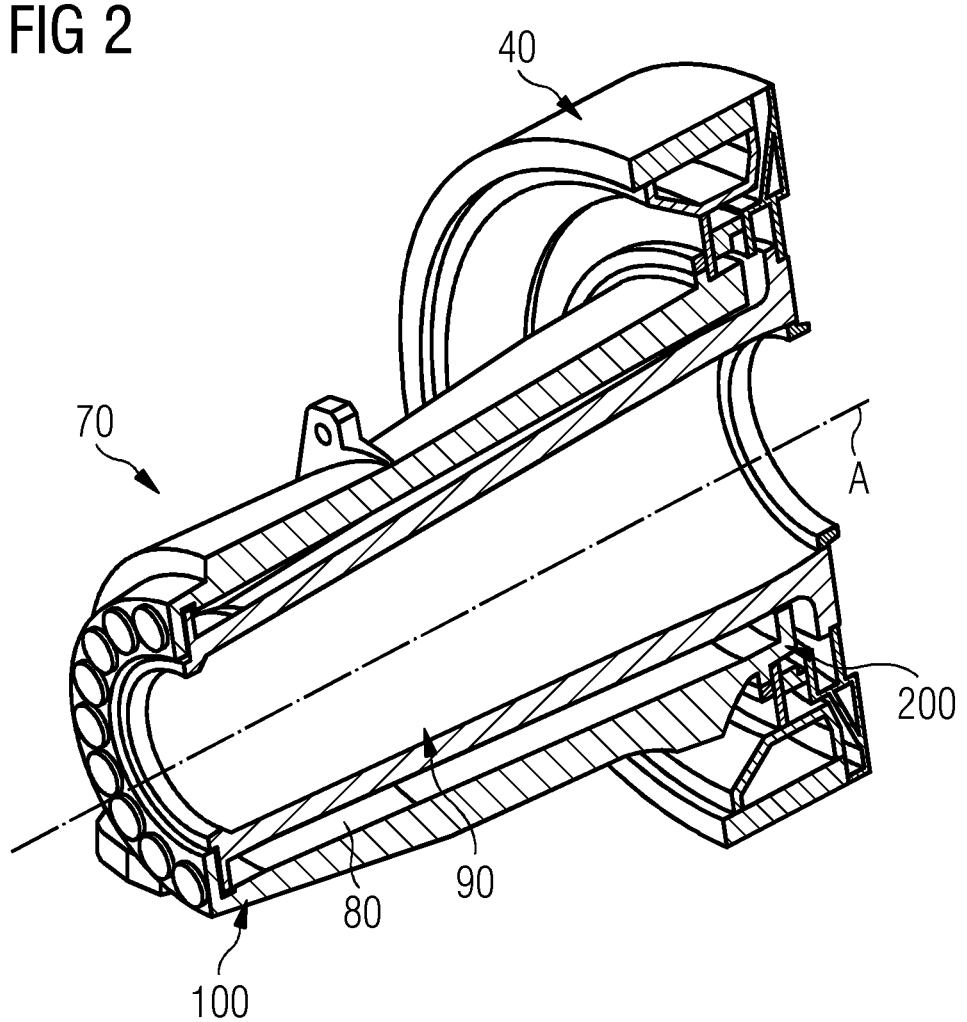
FIG. 2 depicts a side perspective view on a sectional cut along the longitudinal axis of a bearing arrangement of the wind turbine of FIG. 1.

FIG. 2 shows a side perspective view on a sectional cut along the longitudinal axis A of the bearing arrangement 70 of the wind turbine 10 of FIG. 1. The bearing arrangement 70 comprises a bearing housing 80 and a drive shaft 90, whereby the drive shaft 90 is arranged within the bearing housing 80 in an axial direction along the longitudinal axis A of the bearing housing 80 as indicated in FIG. 2. The longitudinal axis A of the bearing housing 80 corresponds to the longitudinal axis A of the drive shaft 90 and thereby is a longitudinal axis A of the bearing arrangement 70. The bearing arrangement 70 further comprises a downwind bearing 100 and an upwind bearing 200 as radial fluid bearings, whereby the downwind bearing 100 and the upwind bearing 200 are arranged between the bearing housing 80 and the drive shaft 90. In particular, the downwind bearing 100 is arranged about a downwind portion of the drive shaft 90 and the upwind bearing 200 is arranged about an upwind portion of the drive shaft 90. The drive shaft 90 is operatively connected to the generator 40. The generator 40 is shown as a direct drive generator. However, it is also possible to provide the generator 40 as a geared generator, for example.

Figure 3:
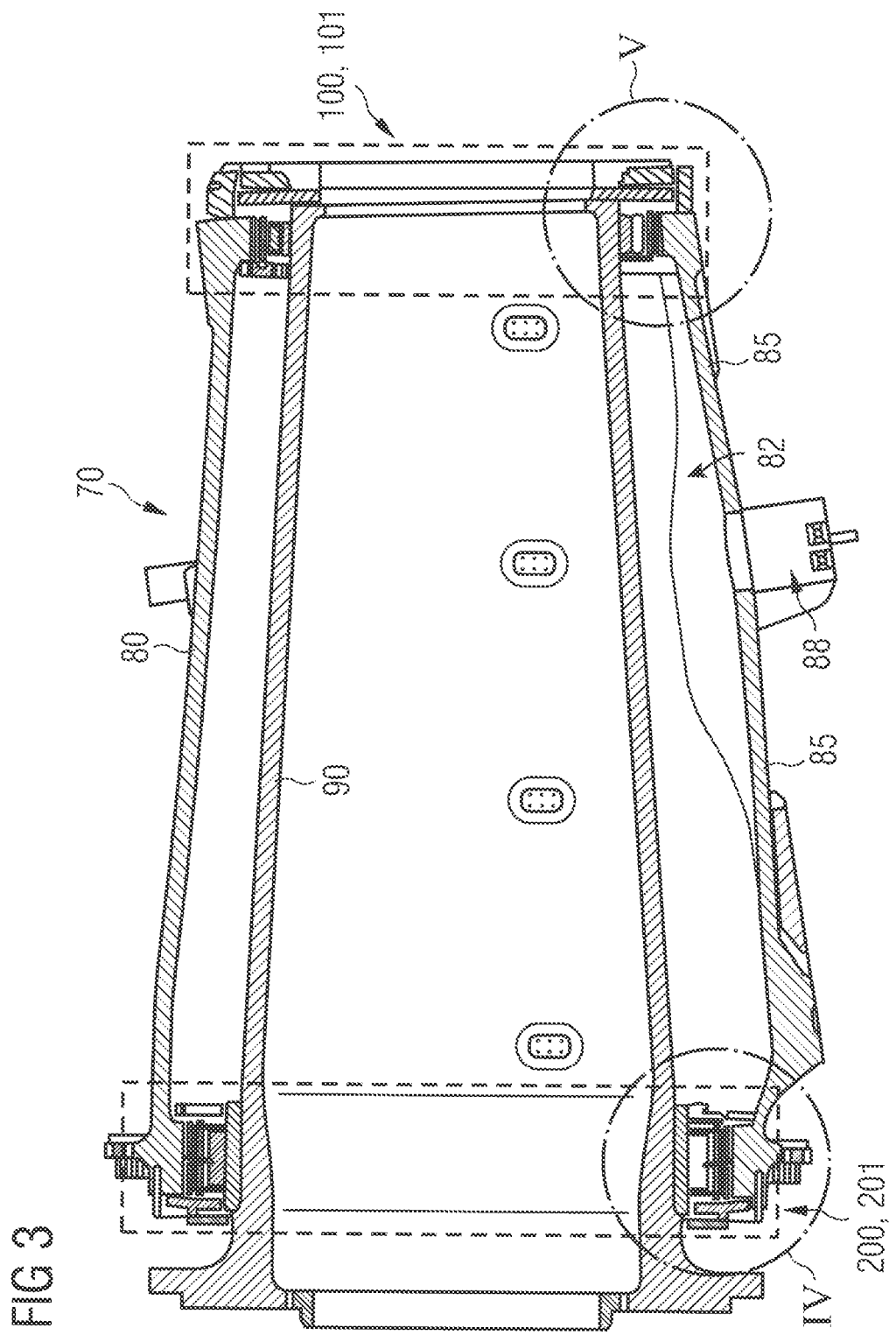
FIG. 3 depicts a side view on a sectional cut along the bearing arrangement of the wind turbine of FIG. 1.

FIG. 3 shows a side view on a sectional cut along the longitudinal axis A of the bearing arrangement 70 of FIG. 2. An internal space 82 of the bearing housing 80 is formed between the bearing housing 80 and the drive shaft 90. Lubricant may leak from the downwind bearing 100 and the upwind bearing 200 into the internal space 82 and thereby be collected in the bearing housing 80, which is formed as a funnel 85 in a bottom part of the bearing housing 80. A lubricant pump 88 is fluidically connected to a drain outlet (not shown) of the bearing housing 80. Moreover, the downwind bearing 100 comprising a lubricant flooded chamber 101 and the upwind bearing 200 comprising a lubricant flooded chamber 201 are shown, the principle and features of which will further be explained with reference to FIG. 4 and FIG. 5.

Figure 4:
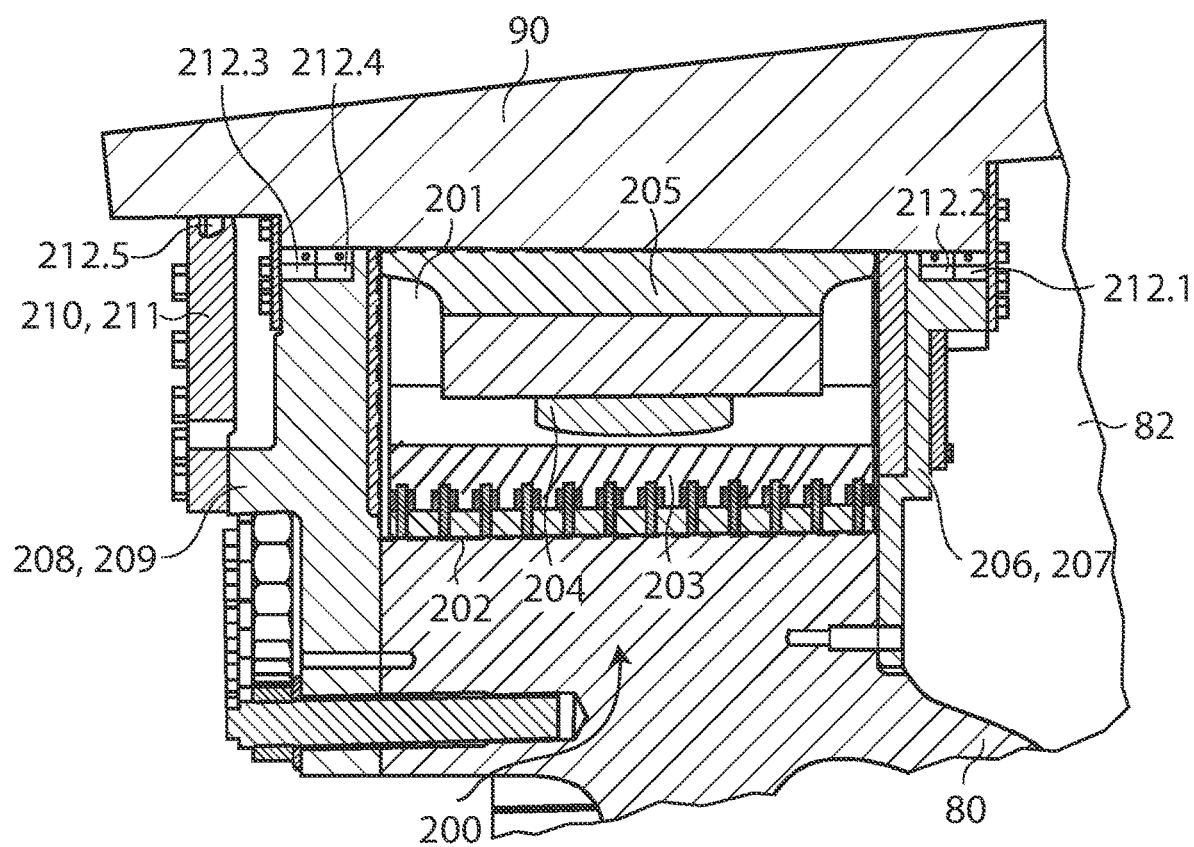
FIG. 4 depicts a view on a detail of the bearing arrangement of FIG. 3.

FIG. 4 shows an enlarged view on the sectional cut through the upwind bearing 200 and its lubricant flooded chamber 201 according to the detail IV of FIG. 3. A radial bearing body 203 is attached to the bearing housing 80. Specifically, the radial bearing body 203 is attached to a cylindrical seat 202 formed in the bearing housing 80. A radial tiltable support structure 204 is secured to the radial bearing body 203. A radial bearing pad 205 is attached to the radial tiltable support structure 204. The radial bearing pad 205 is arranged in sliding contact with the drive shaft 90. The radial tiltable support structure 204 allows for a tilting movement of the radial bearing pad 205. Multiple of such radial bearing units comprising a radial bearing body 203, a radial tiltable support structure 204 and a radial bearing pad 205 are arranged in series along the cylindrical seat 202 in the lubricant flooded chamber 201, in particular along a circumference of the cylindrical seat 202 of the upwind bearing 200.

The lubricant flooded chamber 201 of the upwind bearing 200 is sealed by means of an inner sealing 206 against the internal space 82 of the bearing housing 80. The inner sealing 206 of the lubricant flooded chamber 201 of the upwind bearing 200 comprises multiple inner sealing plates 207. Two lip seals 212.1, 212.2 are arranged in series between the inner sealing 206 and the drive shaft 90 so as to seal the sealing 206 against the drive shaft 90.

The lubricant flooded chamber 201 of the upwind bearing 200 is sealed against an outside of the bearing housing 80 by means of an outer sealing 208 and a dust sealing 210. The outer sealing 208 comprises an outer seal plate 209 and two lip seals 212.3, 212.4 arranged in series in between the outer seal plate 209 and the drive shaft 90. The dust sealing 210 is formed by a dust seal plate 211 and a further lip seal 212.5 arranged between the dust seal plate and the drive shaft 90. The dust sealing 210 is located towards the outside of the bearing housing 80. The dust sealing 210 sandwiches the outer sealing 208 in between the dust sealing 210 and the outer sealing 206.

Figure 5:
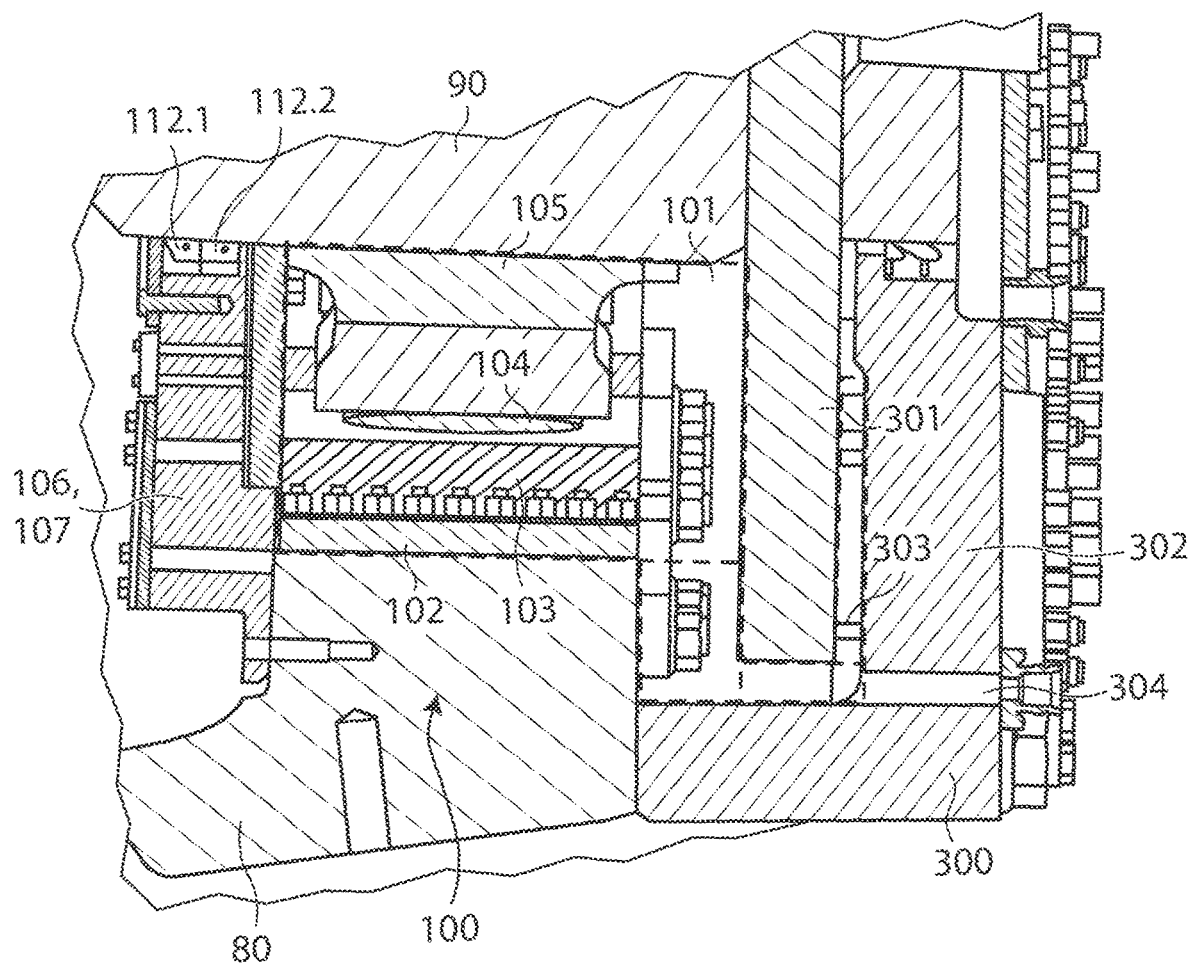
FIG. 5 depicts a view on a further detail of the bearing arrangement of FIG. 3.

FIG. 5 shows an enlarged view on the sectional cut through the downwind bearing 100 and its lubricant flooded chamber 101 according to the detail V of FIG. 3. A radial bearing body 103 is attached to a bearing housing 80. Specifically, the radial bearing body 103 is attached to a cylindrical seat 102 formed in the bearing housing 80. A radial tiltable support structure 104 is secured to the radial bearing body 103. A radial bearing pad 105 is attached to the radial tiltable support structure 104. The radial bearing pad 105 is arranged in sliding contact with the drive shaft 90. The radial tiltable support structure 104 allows for a tilting movement of the radial bearing pad 105. Multiple of such radial bearing units comprising a radial bearing body 103, a radial tiltable support structure 104 and a radial bearing pad 105 are arranged in a series along the cylindrical seat 102 in the lubricant flooded chamber 101, in particular along a circumference of the cylindrical seat 102 of the downwind bearing 100.

The lubricant flooded chamber 101 of the downwind bearing 100 is sealed by means of an inner sealing 106 against the internal space 82 of the bearing housing 80. The inner sealing 106 of the lubricant flooded chamber 101 of the downwind bearing 100 comprises multiple inner sealing plates 107. Two lip seals 112.1, 112.2 are arranged in series between the inner sealing 106 and the drive shaft 90 so as to seal the sealing 106 against the drive shaft 90.

The lubricant flooded chamber 101 is fluidically connected to an effective path provided by a lubricant flow channel 303 of an axial bearing 300 of the bearing arrangement 70. The axial bearing 300 comprises an axial collar 301 and multiple axial bearing pads (not shown here) attached to a axial bearing stop 302. The axial collar 301 is attached to the drive shaft 90. The axial collar 301 extends outwards from the drive shaft 90. The axial collar 301 extends along an entire circumference of the drive shaft 90. The lubricant flow channel 303 of the axial bearing 300 is formed between the axial collar 301 and the multiple axial bearing pads of the axial bearing stop 302. An overflow channel 304 of the axial bearing 300 is arranged in fluidical contact with the lubricant flooded chamber 101. By means of the overflow channel 304, excessive lubricant may be released out of the lubricant flooded chamber 101. The overflow channel 304 may be connected to the internal space 82 for releasing the lubricant into the bearing housing 80. The downwind bearing 100 has the axial bearing 300 as a sealing of the oil flooded chamber 101 against the outside of the bearing housing 80.

Figure 6:
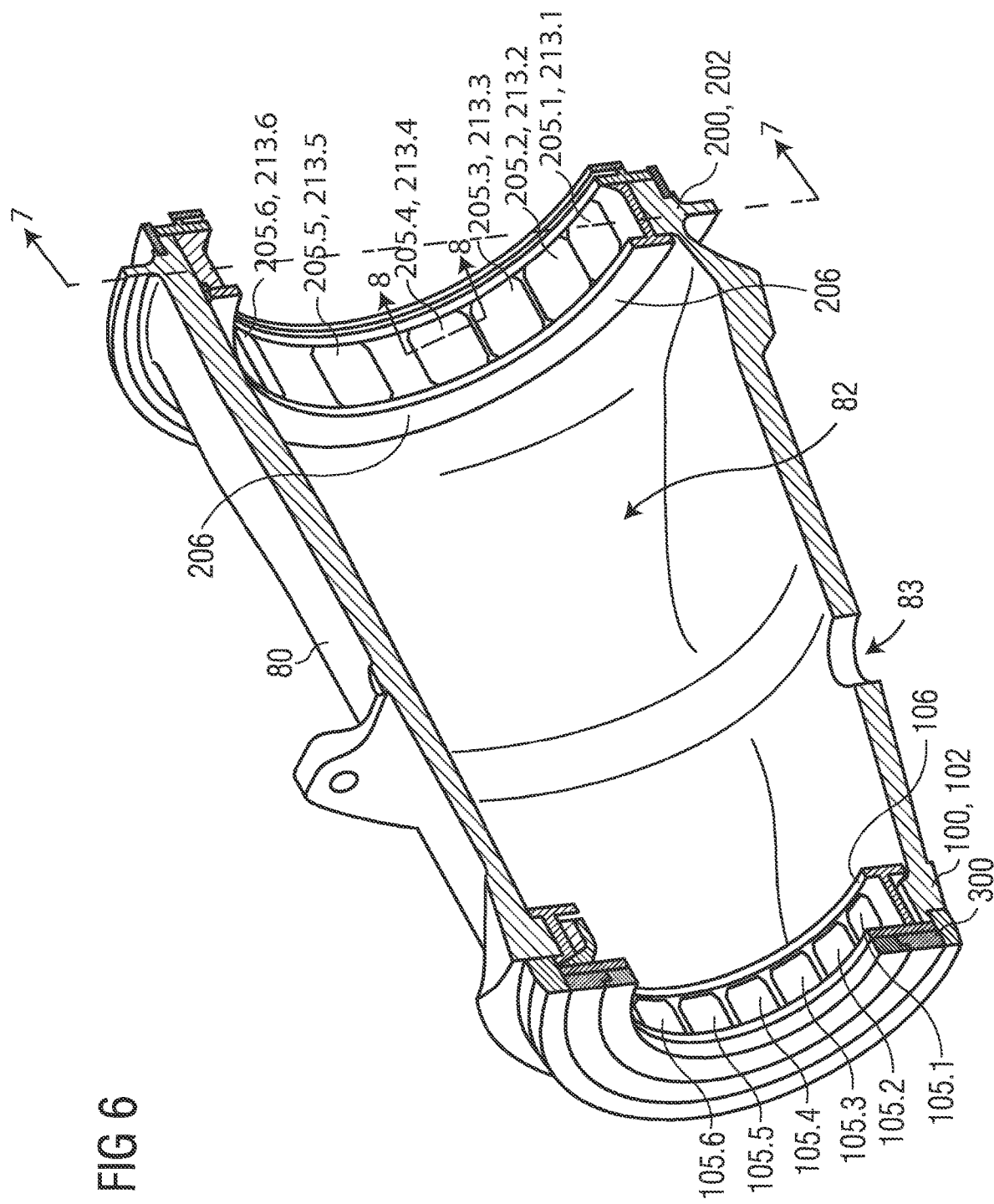
FIG. 6 depicts a side perspective view on a sectional cut along the longitudinal axis of another bearing arrangement of the wind turbine of FIG. 1.

FIG. 6 shows a side perspective view on a sectional cut along the longitudinal axis A of another bearing housing 80 of the wind turbine 10 of FIG. 1 and through the drain outlet 83. As can be seen, there are multiple radial bearing pads 105.1, 105.2, 105.3, 105.4, 105.5, 105.6 arranged as a series at the cylindrical seat 102 of the downwind bearing 100. The inner sealing 106 is arranged between the radial bearing pads 105.1, 105.2, 105.3, 105.4, 105.5, 105.6 and the internal space 82 of the bearing housing 80 and attached to the bearing housing 80, in particular to the cylindrical seat 102. Moreover, the axial bearing 300 is arranged at the bearing housing 80 next to the downwind bearing 100. Moreover, there are multiple radial bearing pads 205.1, 205.2, 205.3, 205.4, 205.5, 205.6 arranged at the cylindrical seat 202 of the upwind bearing 200. An inner sealing 206 is arranged between radial bearing pads 205.1, 205.2, 205.3, 205.4, 205.5, 205.6 and the internal space 82 of the bearing housing 80 and attached to the bearing housing 80, in particular to the cylindrical seat 202.

FIG. 7 shows a front view on a sectional cut through the bearing arrangement 70 of FIG. 6 of the upwind bearing 200. Multiple radial bearing units 213.1, 213.2, 213.3, 213.4, 213.5, 213.6, 213.7, 213.8, 213.9, 213.10, 213.11, 213.12, 213.13, 213.14 are attached to the cylindrical seat 202 of the upwind bearing 200. The cylindrical seat 202 is integrally formed with the bearing housing 80.

FIG. 8 shows a view on a detail of the bearing arrangement 70 of FIG. 7 showing a sectional cut of the radial bearing unit 213 and its attachment to the cylindrical seat 202 of the bearing housing 80. A curved interface plate 214 is attached to the radial bearing body 203 of the radial bearing unit 213 opposite of the radial bearing pad 205, whereby the interface plate 214 is arranged in contact with a cylindrical seat 202 of the upwind bearing 200 formed as a radial fluid bearing. The radial bearing body 203 comprises a ball socket for the radial tiltable support structure 204, which comprises a ball head resting on the ball socket.

Figure 9A:
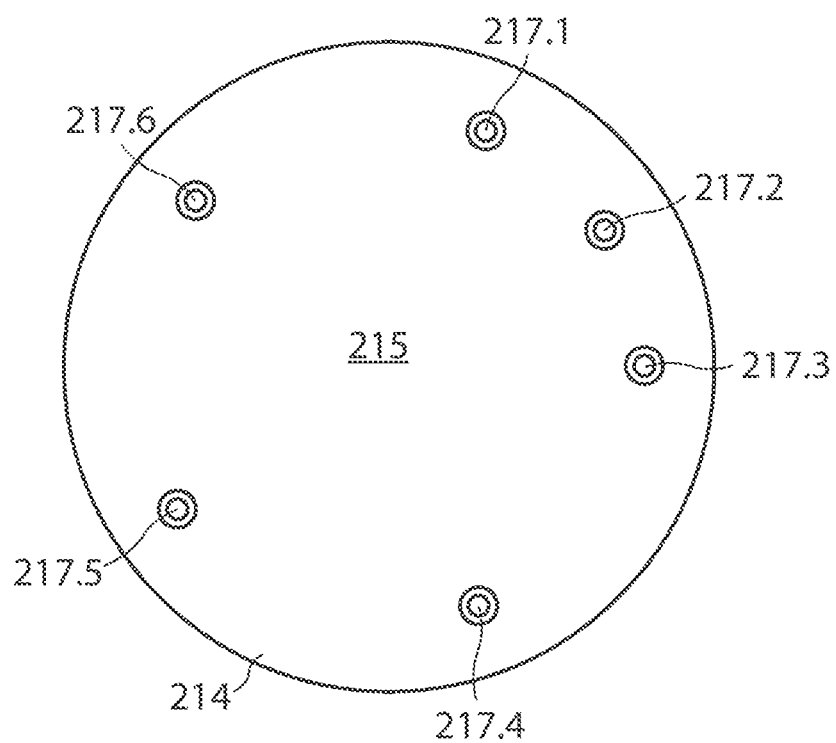
FIG. 9A depicts a top view on a curved interface plate as shown in the bearing arrangement of FIG. 8.
Figure 9B:
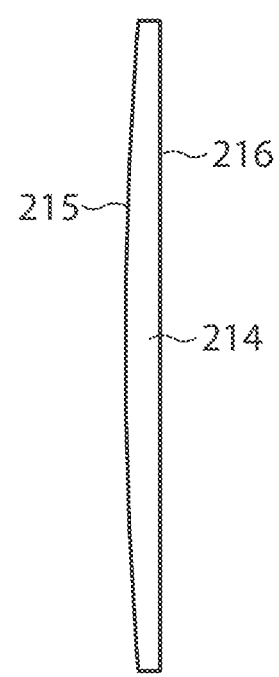
FIG. 9B depicts a side views on a curved interface plate as shown in the bearing arrangement of FIG. 8.

As shown in FIGS. 9A and 9B, the interface plate 214 comprises a first interface plate side 215 and a second interface plate side 216. The first interface plate 214 has a circular circumference. The first interface plate side 215 is located opposite of the second interface plate side 216. The second interface plate side 216 is plain. The first interface plate side 215 has a curvature corresponding to the curvature of the cylindrical seat 202. Further, the interface plate 214 comprises six interface plate through holes 217.1, 217.2, 217.3, 217.4, 217.5, 217.6 arranged throughout the interface plate 214. In particular, the interface plate through holes 217.1, 217.2, 217.3, 217.4, 217.5, 217.6 are arranged around a center of the interface plate 214.

As further shown in FIG. 8, the interface plate 214 is contacting with its first interface plate side 215 the cylindrical seat 202 of the bearing housing 80. The interface plate 214 is connected by means of the along the sectional cut visible interface plate through holes 217 (not shown in FIG.

8 but shown in FIG. 9), in which a bolt fastening the interface plate 214 to the radial bearing body 203 may be inserted.

The radial bearing body 203 is fixed to the cylindrical seat by means of two fastening elements 219.1, 219.2, for example bolts, partially extending through the radial bearing body 203 and protruding into the cylindrical seat 202 of the bearing housing 80. The fastening elements 219.1, 219.2 are located opposite of one another in the tangential direction along the circumference of the cylindrical seat 202. The fastening elements 219.1, 219.2 prevent movement of the radial bearing body 203, and thereby the interface plate 214, in a radial direction from the bearing housing 80 to the drive shaft 90.

The radial bearing body 203 is fixed by means of two limit stops 220.1, 220.2 arranged in grooves of the cylindrical seat 202 of the bearing housing 80 so as to prevent a movement of the interface plate 214 and thereby the radial bearing body 203 in a tangential direction along the circumference of the cylindrical seat 202. The two limit stops 220.1, 220.2 are therefore arranged adjacent to and in contact with the radial bearing body 203 in a tangential direction along the circumference of the cylindrical seat 202 and opposite of each other in the tangential direction.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A bearing arrangement for a wind turbine comprising:
    a bearing housing having a cylindrical seat with a circumferential curved inner surface;
    a drive shaft arranged within the bearing housing in an axial direction along a longitudinal axis of the bearing housing;
    a downwind bearing; and
    an upwind bearing, wherein the downwind bearing and the upwind bearing are arranged between the bearing housing and the drive shaft, further wherein the downwind bearing and/or the upwind bearing is a radial fluid bearing comprising multiple radial bearing bodies and multiple radial tiltable support structures secured to the multiple radial bearing bodies,
    wherein each one of a multiple of radial bearing pads is attached to a corresponding one of the multiple radial tiltable support structures and the multiple radial bearing pads are arranged about the drive shaft;
    wherein at least one curved interface plate is attached to at least one of the multiple radial bearing bodies on a surface of the at least one of the multiple radial bearing bodies facing the cylindrical seat of the bearing housing and opposite one of the multiple radial bearing pads, wherein the at least one curved interface plate includes a curved outer surface on a side of the at least one curved interface plate facing the cylindrical seat such that the curved outer surface has a curvature which corresponds to a curvature of the circumferential curved inner surface, and the at least one curved interface plate is arranged in contact with the cylindrical seat of the bearing housing.

2. The bearing arrangement according to claim 1, wherein a first interface plate side of the at least one curved interface plate is in contact with the cylindrical seat and has a curvature corresponding to a curvature of the cylindrical seat.

3. The bearing arrangement according to claim 2, wherein a second interface plate side of the at least one curved interface plate is located opposite of the first interface plate side and is predominantly plain or plain.

4. The bearing arrangement according to claim 1, wherein the at least one curved interface plate comprises at least one interface plate attachment means for attaching the at least one curved interface plate to the at least one of the multiple radial bearing bodies.

5. The bearing arrangement according to claim 4, wherein the at least one interface plate attachment means is an interface plate through hole.

6. The bearing arrangement according to claim 1, wherein the at least one of the multiple radial bearing bodies to which the at least one curved interface plate is attached is fixed by means of limit stops attached to the cylindrical seat, further wherein the limit stops are adjacent to the at least one of the multiple radial bearing bodies in a tangential direction along a circumference of the cylindrical seat.

7. The bearing arrangement according to claim 1, wherein the at least one of the multiple radial bearing bodies to which the at least one curved interface plate is attached is fixed to the cylindrical seat by means of at least one fastening element, further wherein the at least one fastening element at least partially extends through the at least one of the multiple radial bearing bodies.

8. The bearing arrangement according to claim 1, wherein at least one of the multiple radial tiltable support structures comprises a ball head.

9. The bearing arrangement according to claim 8, wherein the at least one of the multiple radial bearing bodies securing the at least one of the multiple radial tiltable support structures comprising the ball head comprises a ball socket for the ball head.

* * * * *